(12) United States Patent
Salmenoja et al.

(10) Patent No.: US 11,725,341 B2
(45) Date of Patent: Aug. 15, 2023

(54) METHOD OF TREATING FLY ASH OF A RECOVERY BOILER

(71) Applicant: ANDRITZ OY, Helsinki (FI)

(72) Inventors: Keijo Salmenoja, Monnanummi (FI); Niko Metsämuuronen, Kotka (FI); Marjukka Joutsimo, Lappeenranta (FI); Ismo Reilama, Reila (FI)

(73) Assignee: Andritz Oy, Helsinki (FI)

( * ) Notice: Subject to any disclaimer, the term of this patent is extended or adjusted under 35 U.S.C. 154(b) by 800 days.

(21) Appl. No.: 16/609,006

(22) PCT Filed: Apr. 26, 2018

(86) PCT No.: PCT/FI2018/050302
§ 371 (c)(1),
(2) Date: Oct. 28, 2019

(87) PCT Pub. No.: WO2018/197753
PCT Pub. Date: Nov. 1, 2018

(65) Prior Publication Data
US 2020/0181841 A1    Jun. 11, 2020

(30) Foreign Application Priority Data
Apr. 28, 2017 (FI) .................................... 20175380

(51) Int. Cl.
*D21C 11/06* (2006.01)
*B01D 9/00* (2006.01)
(Continued)

(52) U.S. Cl.
CPC ............ *D21C 11/066* (2013.01); *B01D 9/005* (2013.01); *B01D 9/0018* (2013.01);
(Continued)

(58) Field of Classification Search
CPC ... D21C 11/066; D21C 11/0007; D21C 11/06; D21C 11/00; D21C 11/063;
(Continued)

(56) References Cited

U.S. PATENT DOCUMENTS

| 4,470,876 A * | 9/1984 | Beaupr/e/ .......... D21C 11/0035 162/16 |
| 5,562,804 A | 10/1996 | Pikkujaemsae et al. |

(Continued)

FOREIGN PATENT DOCUMENTS

| CL | 42925 | 1/2001 |
| EP | 0 656 083 | 6/1995 |

(Continued)

OTHER PUBLICATIONS

Tran et. al. 2004. Chloride and potassium removal processes for kraft pulp mills: a technical review International Chemical Recovery Conference. Charleston, SC, Tappi/PAPTAC. (Year: 2004).*
(Continued)

*Primary Examiner* — Liam Royce
(74) *Attorney, Agent, or Firm* — Nixon & Vanderhye P.C.

(57) ABSTRACT

A method of treating fly ash containing sodium sulfate from a recovery boiler of a chemical pulp mill. This method includes at least the following steps: a) ash is dissolved in an aqueous solution and the pH of the solution is adjusted with alkali for precipitating impurities, b) the solution is filtered for removing the impurities containing precipitate, c) sodium sulfate is crystallized from the solution and the crystals are separated from the solution by filtering or by centrifugation, and d) the crystallized sodium sulfate is used as initial material for producing sodium and sulfur containing chemicals or as process chemical.

17 Claims, 1 Drawing Sheet

(51) Int. Cl.
*B01D 15/36* (2006.01)
*C01D 5/16* (2006.01)
*D21C 11/00* (2006.01)

(52) U.S. Cl.
CPC ............ *B01D 15/361* (2013.01); *C01D 5/16* (2013.01); *D21C 11/0007* (2013.01); *D21C 11/0035* (2013.01)

(58) Field of Classification Search
CPC ........ B01D 9/0018; B01D 9/005; B01D 9/00; B01D 15/361; B01D 53/48; C01D 5/16; C01D 5/00; C01B 17/96; C04B 18/08; Y02W 30/50
See application file for complete search history.

(56) References Cited

U.S. PATENT DOCUMENTS

| | | | | |
|---|---|---|---|---|
| 5,628,874 | A | * | 5/1997 | Lindberg ............ D21C 11/066 162/50 |
| 5,980,717 | A | * | 11/1999 | Pudas ................. D21C 11/005 210/660 |

FOREIGN PATENT DOCUMENTS

| | | |
|---|---|---|
| EP | 0 852 272 | 7/1998 |
| EP | 2 427 598 | 1/2016 |
| FR | 2 761 088 | 9/1998 |
| SE | 512 504 | 3/2000 |
| SU | 996 582 | 2/1983 |
| WO | 98/19003 | 5/1998 |
| WO | 00/61859 | 10/2000 |
| WO | 03/016616 | 2/2003 |
| WO | 2011/002354 | 1/2011 |

OTHER PUBLICATIONS

Paleologou et. al. 1997. Enhancement of the current efficiency for sodium hydroxide production from sodium sulphate in a two-compartment bipolar membrane electrodialysis system. Separation and Purification Technology 11:159-171. (Year: 1997).*
Notice cited in Swedish Patent Application No. 1951194-8 mailed May 14, 2021, 6 pages.
Office Action cited in Chili Application No. 201902952 dated Mar. 3, 2021, 11 pages.
International Search Report for PCT/FI2018/050302 dated Aug. 31, 2018, 5 pages.
Written Opinion of the ISA for PCT/FI2018/050302 dated Aug. 31, 2018, 7 pages.
Database WPI Week 198350, XP002783864 & SU996582, Feb. 15, 1983, one (1) page.
Swedish Office Action cited in 1951194-8, dated Aug. 10, 2020, 11 pages.
Andreas Liedberg, "Ash Treatment Pays Off In Cleaner Recovery Boiler Conditions", retrieved Aug. 6, 2020, 1 page.
Fredrik Ohman et al., "Electrolysis Of Sodium Sulphate—Efficient Use of Saltcake and ESP Dust In Pulp Mills", Apr. 30, 2014, 94 pages.
Teemu Kinnarinen et al., "Effective Removal Of Hazardous Trace Metals From Recovery Boiler Fly Ashes", Journal of Hazardous Materials 344 (2018) 770-777.
Helena Lundblad, "Split Of Sodium And Sulfur In A Kraft Mill And Internal Production Of Sulfuric Acid And Sodium Hydroxide", Stockholm 2012, 80 pages.

* cited by examiner

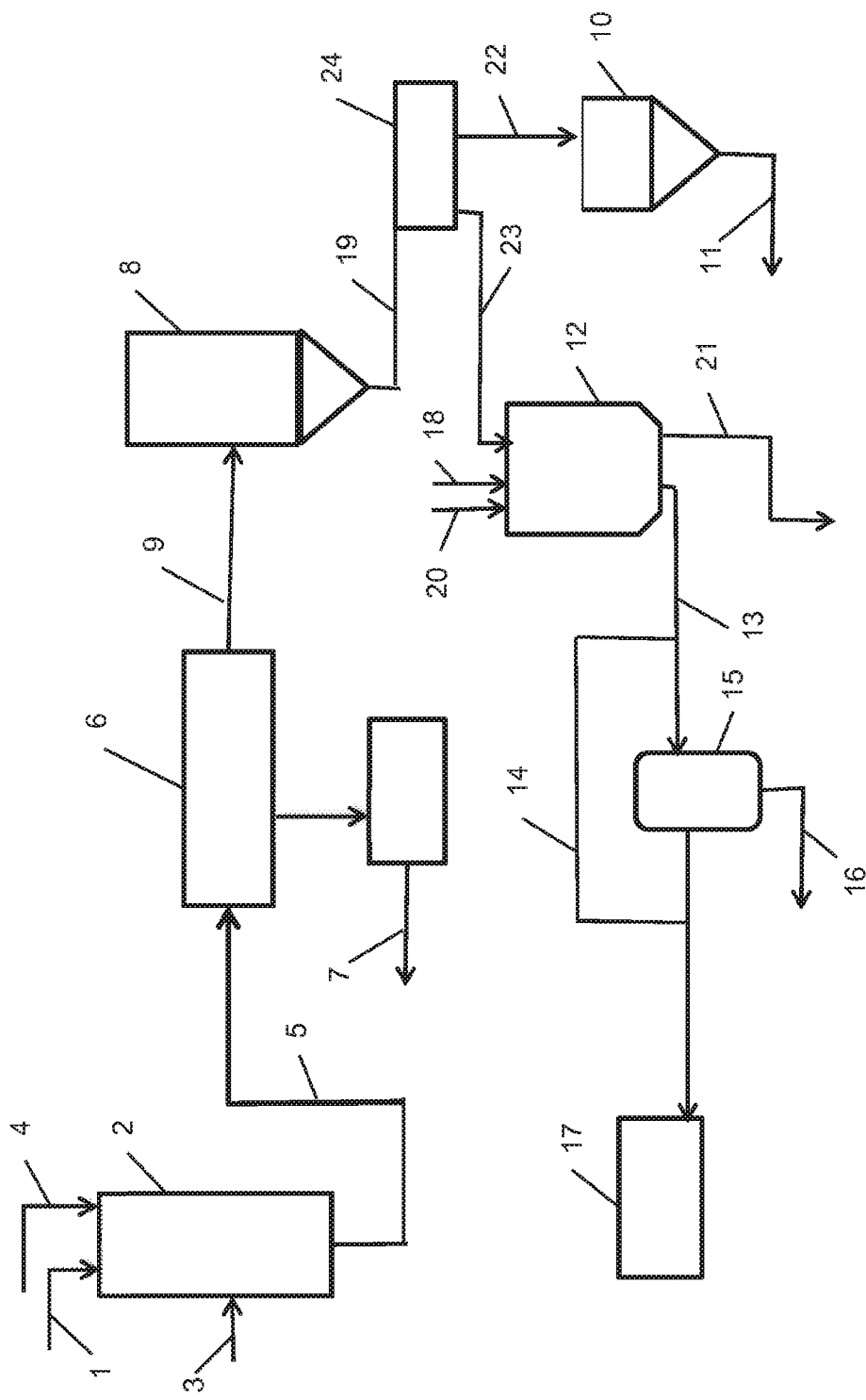

METHOD OF TREATING FLY ASH OF A RECOVERY BOILER

RELATED APPLICATIONS

This application is the U.S. national phase of International Application PCT/FI2018/050302 filed Apr. 26, 2018, which designated the U.S. and claims priority to Finnish Patent Application 20175380 filed Apr. 28, 2017, the entire contents of both of which applications are incorporated by reference.

BACKGROUND OF INVENTION

The present invention relates to treatment and purifying of fly ash coming from an electrostatic precipitator for sodium sulfate-containing material streams of a chemical pulp mill, especially a recovery boiler, such as a kraft recovery boiler As a result of the operation of a recovery boiler, part of the inorganic substance of black liquor is removed from the furnace of the boiler entrained in flue gases in solid form, i.e. as so-called fly ash, by means of electrostatic precipitators. Fly ash contains mainly sodium sulfate (typically 80-90%), sodium carbonate (typically 5-15%) and sodium chloride and potassium chloride. Normally said ash is returned to the recovery cycle via a mixing tank of the recovery boiler. The amount of ash being returned depends on the size of the boiler, but typically it is approximately 10% of the amount of dry solids to be combusted. In some cases it is inevitable to remove fly ash of a recovery boiler from the recovery cycle for controlling the sulfur/sodium (S/Na) balance of the chemical pulp mill or for removing excess potassium (K) and chloride (Cl).

Traditionally the fly ash removed from the chemical cycle has been dissolved in water or condensate and the solution has been led to an effluent plant. Due to tightening environmental regulations it is obvious that dissolving of ash will be prohibited at some time interval, whereby alternative methods for controlling the S/Na-balance of the mill, and the amount of potassium and chloride, will be needed. Fly ash, the main components of which are sodium sulfate and sodium carbonate, is very light, so that its transportation somewhere else is not economically profitable.

The sulfur balance of a chemical pulp mill is burdened, especially for soft wood mills, by the sulfuric acid ($H_2SO_4$) used for tall oil splitting that brings excess sulfur into the balance of the mill, even up to 5.0 kg per produced ton of pulp (ADt). This excess sulfur is typically removed by removing from the chemical cycle part of the fly ash of the recovery boiler. A problem in this method is that simultaneously also a valuable cooking chemical, i.e. sodium (Na) is removed, which has to be replaced by adding sodium hydroxide (NaOH) into the chemical cycle of the chemical pulp mill.

Another component burdening the sulfur balance of a chemical pulp mill is acid salt, so-called sodium sesquisulfate ($Na_3H(SO_4)_2$), that comes from the chloride dioxide plant and contains sodium sulfate ($Na_2SO_4$), which acid salt is usually returned either to the black liquor evaporation plant and there through into the chemical cycle, or it is used in bleaching in pH adjustment or dissolved in effluents. Usually these sulfate containing salts are generated in the mill approximately in the amount of 50-60 tons per day, i.e. approximately 30-40 kg/ADt. Sesquisulfate is formed in the amount of approximately 1.5 kg per each produced kg of chloride dioxide ($ClO_2$). In some mills the sesquisulfate of the chloride dioxide plant is dissolved and led into effluent treatment, whereby it does not burden the S/Na balance of the mill any more, but on the other hand increases effluent emissions from the mill. Acid salt of a chloride dioxide plant is usually neutralized, and it is also referred to as waste salt or waste acid.

SUMMARY OF INVENTION

An object of the present invention is to decrease or completely stop discharge of sodium sulfate containing material streams into effluent streams of the mill or into other waste streams and to provide a new method of treating them. Especially the invention relates to treatment of fly ash from the recovery boiler, which ash has to be removed from the chemical cycle. An object is also to improve the use of acid salt of the chloride dioxide plant.

In the new method, sodium sulfate ($Na_2SO_4$) contained in ash is used to produce Glauber's salt (decahydrate of sodium sulfate, $Na_2SO_4*10H_2O$) or anhydrous sodium sulfate. These can either be utilized internally at the mill or commercially and sold out from the mill, whereby the need for discharge of ash and its passing into effluent streams is substantially decreased or it can even be completely prevented.

In the new method, sodium sulfate-containing fly ash of the recovery boiler of a chemical pulp mill is purified. The method comprises at least the following steps:
  a) ash is dissolved in an aqueous solution and the pH of the solution is adjusted with alkali for precipitation of impurities,
  b) the solution is filtered for removing impurities-containing precipitate,
  c) sodium sulfate is crystallized out from the solution and crystals are separated from the solution by filtering or by centrifugation, and
  d) the crystallized sodium sulfate is used as initial material for producing sodium and sulfur containing chemicals or as process chemical.

The ash is dissolved in an aqueous solution, advantageously either in ion-exchanged water (demi water) or in clean condensate, having a temperature of 32-100° C., preferably over 32° C., most preferably between 35-50° C. The purpose in the dissolving is to produce a saturated or nearly saturated solution. The pH of the solution is adjusted to a level of over 11, preferably over 12, for precipitating inorganic impurities, such as magnesium, present in ash of the recovery boiler. For pH-adjustment alkali is used, typically sodium hydroxide. The water-fly ash mixture is mixed at a constant temperature, which is over 32° C., and mixed until the salt has been dissolved evenly. The formed solution is filtered for removing impurities-containing precipitate and crystallized. The crystallization can be performed either as cooling crystallization or as evaporation crystallization.

In cooling crystallization the filtered solution is cooled to a temperature of below 32.4° C., preferably to a temperature of 10-15° C., simultaneously mixing, whereby in cooling crystallization Glauber's salt crystals ($Na_2SO_4*10H_2O$) are formed at temperatures below 32.4° C. After the crystallization the formed crystals are separated from the mother liquor either by filtering or by centrifugation.

Chloride and potassium have higher solubility in water than other components, and they are enriched in liquid phase, which can be removed from the process.

In evaporation crystallization the filtered solution is concentrated by evaporation, simultaneously mixing, whereby sodium sulfate crystals are generated. By means of evaporation crystallization clean anhydrous sodium sulfate is produced. After the crystallization the formed crystals are separated from the mother liquor either by filtering or by centrifugation. In evaporation crystallization the temperature is most preferably over 70° C., whereby potassium and chloride remain in the mother liquor most efficiently.

Separated sodium sulfate or Glauber's salt can be used as initial material in an electrodialysis process for producing sodium and sulfur chemicals, such as sodium hydroxide and sulfuric acid. For this purpose, the crystals are dissolved in a clean water fraction, such as in clean secondary condensate from an evaporation plant, or in demineralized water.

If Glauber's salt is used at the mill e.g. as initial salt for an electrolysis plant or an electrodialysis (ED) plant, when fly ash is used as raw material, a calcium removal unit is typically required after dissolving of the crystals, preferably an ion-exchange column, in order to obtain an adequately low calcium content of the feed solution, preferably below 1 ppm. Calcium can also be separated by lowering the pH of the crystal solution in connection with the dissolving of the crystals.

Further, the crystals being fed into the electrodialysis equipment are to be carbonate-free, because the cells used in electrodialysis devices break down due to the impact of carbon dioxide ($CO_2$) being released from carbonate under acid conditions. Ash can contain 5-15% of sodium carbonate. Carbonate can be removed from Glauber's salt crystals by means of a suitable acid by adjusting the pH of the Glauber's salt water solution below 6, most preferably to a level of below 4. The acid is preferably acid salt from a chloride dioxide plant, which does not require precleaning and which typically contains sulfuric acid approximately 26%. Alternatively also another acid can be used, such as sulfuric acid, but this increases the consumption of fresh acid at the mill. The acid can be fed directly into the mixing tank for crystals, whereby the pH decreases and it is adjustable. Calcium precipitates and can be removed as precipitate. Simultaneously carbonate is released as carbon dioxide, the separation of which can be improved by efficient mixing or by leading air into the solution.

When calcium is separated in connection with dissolving of the crystals, the ion-exchange unit can typically be passed. Nevertheless, an ion-exchange unit is a useful process device, since it can be needed as a polishing filter.

Potassium (K) and chloride (Cl) present in the ash can be removed together with the discharge liquid, mother liquor, coming from the filtering or centrifugation after the crystallization, whereby preferably no separate potassium or chloride removal plant is needed at the mill.

The chemical recovery cycle of a chemical pulp mill substantially comprises combustion of black liquor in the recovery boiler, which black liquor is separated from chemical pulp and contains cooking chemicals, dissolving the chemical smelt formed in the combustion into green liquor, causticizing of the green liquor into white liquor, which is used in chemical pulping. In the new method, ash generated in the combustion is removed from the chemical recovery cycle, and its sodium sulfate is not recycled back into the recovery boiler. Ash is typically treated in the amount that has to be removed from the chemical cycle and which would have to be dumped from the mill into waste waters. This amount can be tens of tons per day. Due to the new method, leading sodium sulfate into the effluent streams of the mill can be substantially decreased or even stopped.

The final product generated in the crystallization is advantageously Glauber's salt of Pro Analysis (PA) quality or anhydrous sodium sulfate of Pro Analysis quality. The sodium sulfate obtained in evaporation crystallization or cooling crystallization can be used instead of electrolysis also in other production processes as initial material at the chemical pulp mill, where it has been produced, or alternatively outside the mill. It can also be used as process chemical outside the chemical pulp mill, e.g. for fertilizers, detergents, in textile industry or in glass industry.

SUMMARY OF DRAWING

The invention is described in more detail with reference to the appended FIG. 1, which is a schematic illustration of a preferred embodiment for performing the new method.

DETAILED DESCRIPTION OF INVENTION

Fly ash from a recovery boiler is introduced via line 1 into a vessel 2, wherein the ash is dissolved in an aqueous solution from line 3. The aqueous solution is typically either ion-exchanged water (demi water) or clean condensate. The dissolving takes place at a temperature of between 32-100° C., preferably between 35-50° C., whereby the aim is to produce a saturated or almost saturated solution. The pH of the solution is adjusted with alkali, e.g. sodium hydroxide, to a level of approximately 12-13 for precipitating impurities, mainly magnesium (Mg). The alkali is introduced via line 4 into an ash dissolving vessel 2.

The water-fly ash mixture is mixed at a constant temperature, which is over 32° C., and mixed until the sodium sulfate has been dissolved evenly. The solution is filtered e.g. in a cross flow filter 6, into which it is led via line 5. Thereby the magnesium-containing precipitate is separated from the sodium sulfate-containing solution. The precipitate is taken via line 7 into a mixing tank (not shown) at the recovery boiler plant, where ash of the electrostatic precipitator of the recovery boiler is dissolved in liquor.

The filtered solution is led via line 9 into a cooling crystallization vessel 8, where the sodium sulfate is crystallized by cooling crystallization in a way known per se. In cooling crystallization, Glauber's salt crystals ($Na_2SO_4*10H_2O$) are generated at temperatures below 32.4° C. The Glauber's salt crystals (dehydrate of sodium sulfate) are separated from the mother liquor in line 19 by a centrifuge 24. The final product generated in the crystallization is Glauber's salt of Pro Analysis (PA) quality. The crystallization can also be performed by evaporation crystallization, whereby clean, Pro Analysis quality anhydrous sodium sulfate is produced.

Potassium and chloride present in the ash can be removed together with the discharge liquid, mother liquor, coming from the filtering or centrifugation after the crystallization, whereby no separate potassium or chloride removal plant is needed at the mill. The discharge solution from line 22 is precipitated in a clarifier 10, from the bottom of which the potassium and chloride containing solution is led via line 11 out of the chemical cycle of the mill.

The sodium sulfate crystals can be used in an electrodialysis as initial material at the mill. The crystals are led from the centrifuge 9 via line 23 into a subsequent process step, where they are dissolved preferably in ion-exchanged water or in clean condensate in a mixing tank 12. Water or condensate is introduced via line 18. When fly ash is used as raw material, a calcium removal unit, preferably an ion-exchange column 15, is typically needed after dissolving of the crystals, in order to reach an adequately low calcium content of the feed solution, preferably below 1 ppm. The aqueous crystal solution is led via line 13 into the ion exchange column 15, from where the separated calcium is led via line 16 into an ash mixing tank (not shown) of the recovery boiler.

Further, the crystals being fed into the electrodialysis equipment are to be carbonate-free, because the cells used in electrodialysis devices break down due to the impact of carbon dioxide ($CO_2$) being released from carbonate under acid conditions. Carbonate can be removed from Glauber's salt crystals by means of a suitable acid by adjusting the pH of the Glauber's salt water solution below 6, most preferably to a level of below 4. Most advantageous to be used is waste acid of the chloride dioxide plant, which is introduced via line 20. Also another acid can be used, such as sulfuric acid, but this increases the consumption of fresh acid at the mill. When the pH is decreased, also calcium is precipitated and it can be removed as precipitate from the bottom of crystal mixing tank 12. This calcium precipitate is led via line 21 into the recovery boiler ash mixing tank. Since especially the initial salt of an electrodialysis plant must be carbonate-free, the solution can be efficiently mixed or air can be introduced into the solution for releasing carbon dioxide from the solution. When calcium is separated in connection with dissolving of the crystals in the mixing tank 12, the ion-exchange unit 15 can typically be passed via line 14. Nevertheless, the ion-exchange unit 15 is a useful process device, since it can be needed as a polishing filter.

The solution containing Glauber's salt is led into an electrolysis or electrodialysis (ED) plant 17, where it is used as initial salt for producing sodium and sulfur chemicals for the needs of the mill or for use outside the mill. Crystallized sodium sulfate can be used outside the chemical pulp mill as a chemical e.g. for fertilizers, detergents, textile dyeing and for the needs of glass industry.

The operation of an electrodialysis plant is based on the potential difference between a cathode and an anode and the movement of ions through an ion exchange membrane caused by the difference. When there is an electrical field between a cathode and an anode, ions move based on their electric charge, i.e. positively charged ions (cations) are passed to a cathode and respectively negatively charged ions (anions) are passed to an anode. In an electrodialysis unit, always two different diaphragms/membranes are used, cation and anion membranes. Only positively charged ions (cations) pass through a cation membrane and respectively only negatively charged anion pass through an anion membrane. The cells of electrodialysis equipment are formed of successively arranged ion-exchange membranes (cation-anion-membranes).

The new method according to the invention provides following advantages:
- sodium sulfate-containing ash does not need to be led into the effluent streams of the mill anymore, but it can be used for producing chemicals to be used at the mill or outside the mill, or sodium sulfate can be used as such as process chemical typically outside the mill;
- waste acid of the chloride dioxide plant can be utilized in a novel way, and thus further decrease the effluent stream of the mill.

The invention claimed is:

1. A method of treating fly ash containing sodium sulfate from a recovery boiler of a chemical pulp mill, wherein the fly ash is removed from a chemical cycle of the chemical pulp mill for adjusting the chemical balance, said method comprising:

a) dissolving the fly ash in a first aqueous solution, and adjusting the pH of the first aqueous solution with alkali to precipitate impurities from the first aqueous solution with the fly ash,
   b) filtering the first aqueous solution with the fly ash to remove the precipitated impurities,
   c) crystallizing sodium sulfate in the filtered first aqueous solution with the fly ash to form sodium sulfate crystals,
   d) separating the sodium sulfate crystals from the filtered first aqueous solution with the fly ash by filtering or centrifugation,
   e) dissolving the sodium sulfate crystals in a second aqueous solution to form dissolved sodium sulfate crystals,
   f) decreasing with acid the pH of the second aqueous solution with the dissolved sodium sulfate crystals to precipitate calcium from the second aqueous solution, and
   g) after step f), using the dissolved sodium sulfate crystals as an initial material for producing sodium and sulfur containing chemicals and/or as a process chemical.

2. The method according to claim 1, wherein the pH of the first aqueous solution with the fly ash is adjusted with the alkali to a level of over 11 in step a).

3. The method according to claim 1, wherein the step of crystallizing the sodium sulfate crystals in the filtered first aqueous solution with the fly ash includes cooling crystallization and/or evaporation crystallization.

4. The method according to claim 1, wherein the fly ash is dissolved in the step a) at a temperature in a range of 32° C. to 100° C.

5. The method according to claim 1, wherein the method further comprises step removing the precipitated calcium from the second aqueous solution.

6. The method according to claim 1, wherein the acid used in step e) is an acid salt produced in a chloride dioxide plant.

7. The method according to claim 1, wherein the precipitated calcium is removed from the second aqueous solution with the dissolved sodium sulfate crystals using an ion-exchange column.

8. The method according to claim 1, further comprising removing carbonate from the sodium sulfate crystals after step c).

9. The method according to claim 1, wherein the dissolved sodium sulfate crystals are decahydrate of sodium sulfate or an anhydrous sodium sulfate.

10. The method according to claim 1, wherein the dissolved sodium sulfate crystals are used as the initial material in an electrodialysis process or in an electrolysis process to produce sodium and sulfur chemicals.

11. The method according to claim 1, wherein the dissolved sodium sulfate crystals are used outside the chemical pulp mill.

12. The method according to claim 1, further comprising separating a chloride and potassium containing solution from the first filtered aqueous solution with the fly ash and the crystallized sodium sulfate crystals.

13. A method to treat fly ash comprising:
   discharging fly ash from a recovery boiler in a chemical pulp mill;
   dissolving the fly ash in a first aqueous solution;
   precipitating impurities from the aqueous solution with the dissolved fly ash by adding alkaline to increase the pH level to at least eleven of the first aqueous solution with the dissolved fly ash;

filtering the first aqueous solution with the dissolved fly ash to remove the precipitated impurities and form a filtered first aqueous solution with the dissolved fly ash;

crystallizing sodium sulfate in the filtered first aqueous solution with the dissolved fly ash, after the crystallization, separating crystallized sodium sulfate from the filtered first aqueous solution with the dissolved fly ash by filtering or centrifugation, dissolving the crystallized sodium sulfate in a second aqueous solution to form dissolved crystallized sodium sulfate, decreasing with acid the pH of the second aqueous solution with the dissolved crystallized sodium sulfate to precipitate calcium from the second aqueous solution, and using the dissolved crystallized sodium sulfate to produce sodium and sulfur containing chemicals and/or as a process chemical.

14. The method according to claim 13, wherein the first aqueous solution in the step of dissolving of the fly ash is at a temperature in a range of 32° C. to 100° C.

15. The method according to claim 13, further comprising precipitating calcium from the filtered first aqueous solution with the dissolved fly ash.

16. The method according to claim 13, wherein the calcium is precipitated from the dissolved crystallized sodium sulfate in the second aqueous solution in an ion-exchange column.

17. The method according to claim 16, further comprising using the dissolved crystallized sodium sulfate in an electrodialysis process or in an electrolysis process to produce the sodium and the sulfur chemicals.

* * * * *